United States Patent
Ebel et al.

(10) Patent No.: US 12,174,829 B1
(45) Date of Patent: *Dec. 24, 2024

(54) AGGREGATE QUERY OPTIMIZATION

(71) Applicant: Datorama Technologies Ltd., Tel Aviv (IL)

(72) Inventors: Lior Ebel, San Francisco, CA (US); Nir Tzur, San Francisco, CA (US); Hemi Shuvali, San Francisco, CA (US); Tal Marom, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/398,963

(22) Filed: Dec. 28, 2023

Related U.S. Application Data

(63) Continuation of application No. 17/948,291, filed on Sep. 20, 2022, now Pat. No. 11,893,027.

(60) Provisional application No. 63/245,982, filed on Sep. 20, 2021.

(51) Int. Cl.
*G06F 16/24* (2019.01)
*G06F 16/2453* (2019.01)

(52) U.S. Cl.
CPC .. *G06F 16/24537* (2019.01); *G06F 16/24542* (2019.01)

(58) Field of Classification Search
CPC ............. G06F 16/24561; G06F 16/244; G06F 16/24537; G06F 16/24542
See application file for complete search history.

(56) References Cited

U.S. PATENT DOCUMENTS

| | | | | |
|---|---|---|---|---|
| 9,779,147 | B1* | 10/2017 | Sherman | G06F 16/2423 |
| 10,360,527 | B2* | 7/2019 | Abe | G06Q 10/067 |
| 11,080,336 | B2* | 8/2021 | Van Dusen | G06Q 10/10 |
| 11,373,117 | B1* | 6/2022 | Cui | G06F 16/285 |
| 11,675,856 | B2* | 6/2023 | Lin | G06F 18/24 707/706 |
| 2009/0006346 | A1* | 1/2009 | C N | G06F 16/24537 |
| 2011/0246550 | A1* | 10/2011 | Levari | G06F 16/24556 709/201 |
| 2016/0162975 | A1* | 6/2016 | Chen | G06Q 30/0631 705/26.7 |
| 2019/0278600 | A1* | 9/2019 | Frumkin | G06N 3/084 |
| 2019/0325275 | A1* | 10/2019 | Lee | G06V 30/19167 |
| 2020/0143246 | A1* | 5/2020 | Li | G06F 16/26 |
| 2021/0034598 | A1* | 2/2021 | Arye | G06F 16/288 |

\* cited by examiner

*Primary Examiner* — Eliyah S. Harper
(74) *Attorney, Agent, or Firm* — Butzel Long

(57) ABSTRACT

A method, system and computer program product for aggregate query optimization. A dataset with plurality of values divided into dimensions and measurements is received. Pre-calculated values obtained by aggregates of measurements' values respective of plurality of combinations of dimensions' values are calculated and stored for one or more aggregate measurements of interest. Responsive to an input received of a first set of one or more dimensions and a second set of one or more aggregate measurements of interest, an aggregate result value of a respective member of the second set is calculated and outputted by retrieval of the pre-calculated value therefor respective of members of the first set.

20 Claims, 3 Drawing Sheets

AGGREGATE QUERY OPTIMIZATION

RELATED APPLICATION

This application claims the benefit of priority under 35 USC 119 (e) of U.S. Provisional Patent Application No. 63/245,982 filed on Sep. 20, 2021, the contents of which are all incorporated by reference as if fully set forth herein in their entirety.

BACKGROUND

Some embodiments relate to data analysis and, more specifically, but not exclusively, to aggregate query optimization.

A dataset may comprise a description and/or documentation of attributes, behaviors and/or events pertaining to certain entities of interest. Data and/or information of the dataset may be collected and retained in storage in a form of a pre-defined schema, such as for example, one or more tables having pre-defined columns for corresponding features of data instances and/or the like.

In many practical applications, a user such as a data analyst and/or the like, may be interested in aggregates of data recorded for individual instances of the dataset, in order to identify patterns and/or trends, which may be utilized for furthering a desired goal, e.g., streamlining allocation of resources and/or the like.

However, there may be technical difficulties and challenges involved in obtaining the aggregated data sought after. In order to effect retrieval and processing of relevant data in a required manner, a user may be required to possess particular skills and familiarity with an underlying structure of a data store schema and interface therefor. For example, knowledge of a database query language such as Structured Query Language (SQL) and/or the like may be required. Moreover, the dataset information may be distributed among several stores and/or locations, for example, different portions of relevant data may be stored in multiple different tables, thereby further complexity may be added to calculation of aggregates.

Pre-existing approaches and tools which entail writing SQL queries for calculating desired data have many drawbacks and disadvantages. First, a requirement of the user to have SQL knowledge poses a significant limit on a capability of organizations to hire and/or allocate a sufficient competent workforce for such task. Second, complex reports of multiple variables (e.g., data fields, filters, and/or the like) may be cumbersome to write and even more so to debug, causing much time and resources to be spent on fixing errors in SQL statements throughout the process. Third, a user may typically have to come up with a solution of how to write the SQL query efficiently from scratch, and not be able to take advantage of a body of wide knowledge and experience which may be already existent on the industry regarding how to create efficient and maintainable SQL code. Fourth, an underlying database may comprise a large number of records (e.g., billions of rows) which processing thereof even for a well formed SQL query may require long time, ranging from several minutes to even hours, depending on available hardware.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Figure 1:
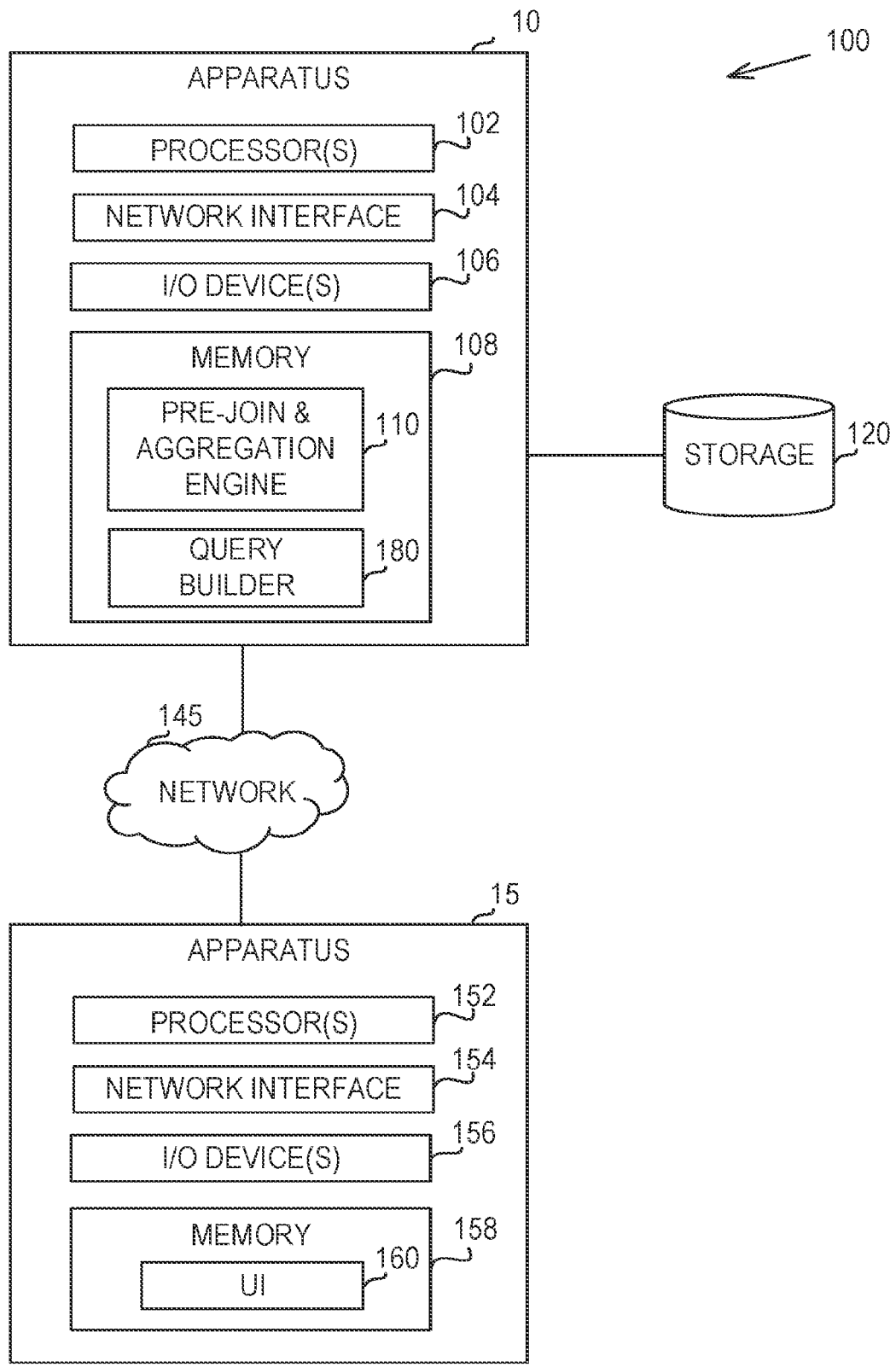
FIG. 1 is a schematic block diagram of an exemplary system for aggregate query optimization, according to some embodiments.

According to an aspect of some embodiments of the disclosed subject matter there is provided a method for aggregate query optimization, comprising: receiving a dataset comprising a plurality of values divided into a plurality of dimensions and a plurality of measurements: for a plurality of iterations respective of a plurality of combinations of values of the plurality of dimensions, calculating and storing for at least one aggregate measurement of interest and a respective one of the plurality of combinations a pre-calculated value obtained by calculating at least one aggregate of respective values of a measurement of the plurality of measurements: in response to receiving an input comprising a first set of one or more of the plurality of dimensions and a second set of one or more of the at least one aggregate measurement of interest, calculating and outputting for a respective member of the second set a respective aggregate result value by retrieving for the respective member of the second set the pre-calculated value respective of members of the first set.

According to another aspect of some embodiments of the disclosed subject matter there is provided a system for aggregate query optimization, comprising: a processing circuitry adapted to execute a code for: receiving a dataset comprising a plurality of values divided into a plurality of dimensions and a plurality of measurements: for a plurality of iterations respective of a plurality of combinations of values of the plurality of dimensions, calculating and storing for at least one aggregate measurement of interest and a respective one of the plurality of combinations a pre-calculated value obtained by calculating at least one aggregate of respective values of a measurement of the plurality of measurements: in response to receiving an input comprising a first set of one or more of the plurality of dimensions and a second set of one or more of the at least one aggregate measurement of interest, calculating and outputting for a respective member of the second set a respective aggregate result value by retrieving for the respective member of the second set the pre-calculated value respective of members of the first set.

According to yet another aspect of some embodiments of the disclosed subject matter there is provided a computer program product comprising: a non-transitory computer readable storage medium: program instructions for executing, by a processor, a method for aggregate query optimization, the method comprising: receiving a dataset comprising a plurality of values divided into a plurality of dimensions and a plurality of measurements: for a plurality of iterations respective of a plurality of combinations of values of the plurality of dimensions, calculating and storing for at least one aggregate measurement of interest and a respective one of the plurality of combinations a pre-calculated value obtained by calculating at least one aggregate of respective values of a measurement of the plurality of measurements: in response to receiving an input comprising a first set of one or more of the plurality of dimensions and a second set of one or more of the at least one aggregate measurement of interest, calculating and outputting for a respective member of the second set a respective aggregate result value by retrieving for the respective member of the second set the pre-calculated value respective of members of the first set.

Optionally, one or more of the at least one aggregate measurement of interest is calculated as a function of a plurality of aggregates respective of at least a subset of the plurality of measurements.

Optionally, in response to the input further comprising a third set of one or more filters defining a selection of values of one or more of the plurality of dimensions, performing the retrieving selectively whereby using a member of the third set for filtering a respective member of the first set.

Optionally, the method further comprising, prior to the calculating and storing, for at least one of the plurality of dimensions, grouping and subsuming respective values thereof by a plurality of bins.

Optionally, the input is received via a user interface whereby selection of the first set and the second set by a user is provided.

More optionally, selection of a third set of one or more filters defining selection of values of one or more of the plurality of dimensions by a user is further provided by the user interface.

Optionally, the pre-calculated value is stored in a data store structured in accordance with a database schema, wherein the retrieving of the pre-calculated value and the calculating of the respective aggregate result value are performed using a query automatically constructed based on the database schema and executed on the data store.

Optionally, the method further comprising incrementally updating the pre-calculated value in response to receiving additional data of the dataset.

Optionally, the dataset comprising a plurality of tables, wherein columns of different tables having defined connections between one another.

Optionally, the at least one aggregate is calculated using an aggregate function selected from the group consisting of: a summation: a count: an average: a minimum; a maximum.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to data analysis and, more specifically, but not exclusively, to aggregate query optimization.

For sake of convenience and ease of understanding, the disclosed subject matter is illustrated and exemplified throughout the description herein with reference to data and/or datasets organized in a form of one or more tables, wherein rows of a table correspond to distinct data instances and columns of a table correspond to features, e.g., fields, attributes, properties, and/or the like. However, the disclosed subject matter is not meant to be limited in such manner and may be utilized for datasets of any format available, as a skilled artisan would readily recognize.

In some embodiments, data columns of a dataset table may be modelled into two sets of column types, which may be of interest and/or relevance for an aspect of a desired aggregate of data values, as described herein. A first set of columns may be of dimensions, such as for example, depictions of entities of interest, and a second set of columns may be of measurements, such as for example, observed occurrences relating to those entities. An analysis of data aggregation may be performed by pre-aggregating into a single data store all possible measurements available on a given dataset and storing the resulting aggregates for all combinations of values of the respective dimensions in a finest granularity level applicable. A query for calculating a desired aggregate may be built and executed on the pre-aggregated data, according to a selection of a set of dimensions, a set of measurements, and optionally a set of filters (defining particular values for which aggregation of data is to be performed).

In some embodiments, the single data store of the pre-aggregated data may be a table comprising columns for the dimensions and measurements values. Optionally the table may be generated by a dedicated engine, also referred to herein as a pre-join and aggregation engine. The engine may be run in response to data being received and/or updated in an underlying database system, which may be periodically, e.g. once a day and/or every few hours, and/or the like. Optionally in each run of the engine a batch of data being brought last into the system may be processed thereby.

In some embodiments, a user interface may be provided for specifying a selection of dimensions, measurements, filters, and/or the like. Optionally a query builder may generate an SQL query based on the user selection, which may calculate the required data aggregates, and consume its data from the table produced by the pre-join and aggregation engine.

A walkthrough example for illustrating the disclosed subject matter and how it may be utilized is provided herein. While in this walkthrough example described, a specific set of tables in a specific case scenario of a digital marketing analytics user being discussed, the disclosed subject matter is not intended to be limited in such manner, but rather it can be generalized to any set of tables where columns thereof and connections therebetween may be known and/or provided as part of a relevant input.

A first table in the walkthrough example may be a table entitled "Campaigns" and captures data on campaigns. The Campaigns table may contain exemplary major columns such as the following:

1. campaign_id—a campaign identifier:
2. campaign_name—a campaign name:
3. campaign_country—a country where the campaign being held.

A second in the walkthrough example may be a table entitled "Emails_sent", describing historical email send events for campaigns and customers. Specifically, the fact that an email was sent to a customer for a specific campaign may be described as a single row in this table, and it may contain exemplary major columns such as the following:

1. email_id—an identifier to a specific email instance:
2. cust_id—a customer identifier:
3. campaign_id—a campaign identifier:
4. send_date_time—a date and time when an email was sent:
5. email_title—an email title.

A third table in the walkthrough example may be a table entitled "Clicks" and which captures data about users who clicked links sent to them on emails. Whenever a user clicks an email sent to her, a record may be added to this table. The table may contain exemplary major columns such as the following:
1. email_id—an identifier to a specific email instance;
2. cust_id—a customer identifier;
3. click_date_time—a date and time when a link in an email sent was clicked.

In the walkthrough example herein, there may be a variety of exemplary reports of interest to a potential user, such as the following:
1. For each campaign, measure a click rate (rate of emails which were clicked), for each day and month in the last year (and in total);
2. For all campaign emails which contain some set of keywords S in their title, compare their click rate to that of all campaign emails which contain some set of keywords T (used to measure what title phrasing is more likely to cause better KPIs for marketing campaigns, for example);
3. For all countries and campaigns, measure the click rate for morning (e.g., 8 AM to 13 PM), noon (e.g., 13 PM to 16 PM) and afternoon (e.g., 16 PM and later). Is there a "better time of day" (in terms of the three mentioned parts of day) which can be used to enable a bigger click rate for some campaigns in some countries?

It will be appreciated that a common notion between the exemplary reports described herein, as well as other likewise reports, is that the data columns can be modelled as dimensions (e.g. campaign name, country) and measurements (e.g. total clicks, total email sends, and click/sends rate). A report of interest may be generated by calculating respective measurements for each value combination of dimensions, while different measurements can have different aggregation functions (e.g. count, sum, max, min, average, and/or the like). Put more generally, when a user defines her report of interest, she may have to choose a set of columns from the available tables and define for each column whether it is a dimension or a measurement, where in case of a measurement, the user may further have to choose what aggregation function is of interest.

In the walkthrough example herein, pre-aggregation of all measurements and storing thereof in a finest granularity of combinations of dimension values, may yield as result one table which may contain exemplary columns such as the following:
1. campaign_id—a campaign identifier;
2. campaign_name—a campaign name;
3. campaign_country—a country where the campaign being held;
4. email_title—an email title;
5. date—a date for which the measurements being calculated in this row;
6. day part—one of three possible values: 1, 2 or 3, representing the three day parts as defined herein, and the day part for which the measurements are calculated in this row (within the date value of this row).
7. total sends—a total number of email sends which occurred for the values combination of the campaign, country, email title, date and day part of this row.
8. total clicks—a total number of email links clicks which occurred for the values combination of the campaign, country, email title, date and day part of this row.
9. click rate—a click rate (percentage of email messages sent which were clicked) which occurred for the values combination of the campaign, country, email title, date and day part of this row.

The table may be obtained by utilizing a pre-join and aggregation engine such as described herein. The engine may be part of a backend server coupled to an underlying database system.

In order to calculate measurement aggregates for a report of interest, a corresponding SQL query may be generated and executed on the table produced at the pre-aggregation phase. The SQL query may be generated by a query builder which may be a part of a user interface coupled to an underlying database system. The user interface may be utilized by a user to specify selection of one or more of the following:
1. a set of dimensions;
2. a set of measurements;
3. a set of filters (optional).

It will be appreciated that the set of filters may be utilized to define which rows may be aggregated (for example, only rows of campaigns in the US, and/or the like).

Following a selection, the user may click "run", and then the query builder may generate an SQL query which may calculate the needed data, and consume its data from the table produced by the pre-join and aggregation engine. As an example, if the user selected the dimensions "campaign" and "country", and the measurement "clicks", the following SQL may be generated and executed on the pre-aggregated data table in a manner transparent to the user (i.e. "behind the scenes"), where the returned results may be provided as output to the user:

select campaign_name, country, sum (click) from pre_calc_data
group by campaign_name, country One technical effect of utilizing the disclosed subject matter is providing for fast analysis of big data aggregations over time broken into different dimensions, which requires no use of coding and may be used by users of any proficiency level including non-developers. The disclosed subject matter may be employed to produce reports based on user selection for underlying data which may contain billions of records in just a few seconds, using an end-to-end pipeline which pre-aggregates the data and generates SQL queries based on the user selection, without requiring any coding or development efforts.

The disclosed subject matter provides many improvements and advantages over pre-existing technology.

In one aspect, user experience may be ameliorated as no coding may be required. In particular, a user may not be required to have SQL knowledge, which may greatly simplify data analysis of an underlying database system and allow for more potential users to benefit from it. Even if the user does have SQL knowledge, she can invest her time in analyzing reports and bringing business impact, while investing no time at all in debugging SQL queries, which often fail because of syntax errors (e.g. a missing semi-colon and/or the like), and does not have to worry about writing efficient SQL for large scale processing.

In another aspect, user experience may be ameliorated in terms of speed. For producing reports of a type such as described herein, when processing a dataset encompassing billions of rows, long time may take until results can be presented. In contrast, as the disclosed subject matter provides for pre-processing joins and aggregations on the background without the user actually being aware of it, the reports may be generated based on pre-aggregated and pre-joined tables which may contain much less data (typically less than a million rows). By result the time for producing reports over such tables may be shortened, e.g., from dozens of minutes to only a few seconds.

In yet another aspect, an overall resource utilization may be ameliorated resulting in cost savings and better environmental care due to decreased energy consumption, for example. As reports may be generated on the pre-aggregated and pre-joined data, much computing power may be saved compared to pre-existing approaches and tools, up to dozens of percentages e.g., a reduction by more than 80% and/or the like). This may have also benefits from environmental aspects, as less computing may be used overall for the benefit of the environment.

It will be appreciated that the pre-joins and pre-aggregations such as may be performed by the pre-join and aggregation engine as described herein may be performed incrementally as additional data may be received and/or updated. The engine may be run each time on a last batch of data being brought in, such as for example, a collection of records and/or events updated in a last passing day. Notably while there may be a considerable value in a calculation done in this phase, the user may not actually need to wait for this calculation to complete in order to see her reports. The reports may be generated based on a table which contains the result of this process, for which the vast majority of data in any given day is already there anyway (only the last day increment of aggregations may not be there yet).

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a schematic block diagram of an exemplary system for aggregate query optimization, according to some embodiments.

A system 100 for aggregate query optimization may comprise an apparatus such as 10, which may be implemented as, for example, a standalone unit, a server, a computing cloud, a desktop computer, a laptop computer, a tablet computer, a smart phone, a wearable computer, a mainframe computer, a quantum computer, and/or the like. Apparatus 10 may be implemented as a customized unit that includes locally stored software and/or hardware that perform one or more of the acts described with reference to FIG. 3 herein. Alternatively or additionally, Apparatus 10 may be implemented as code instructions loaded on an existing computing device. Alternatively or additionally, Apparatus 10 may be implemented as hardware and/or code instructions (e.g., an accelerator card) installed and/or integrated within an existing computing device.

Apparatus 10 may comprise one or more processors such as 102, which may be implemented as, for example, a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include one or more processors (homogenous or heterogeneous), which may be arranged for parallel processing, as clusters and/or as one or more multi core processing units.

In some embodiments, Apparatus 10 may comprise a network interface such as 104 for transmission and/or receipt of data over a network such as 145 and/or other suitable communication channel. Network 145 may be any type of data network, for example, a local area network (LAN), a wireless LAN, a wide area network (WAN), or the connection may be made to an external computer, for example through the Internet using an Internet Service Provider (ISP) and/or any other type of computer network. The wireless LAN may use one or more wireless protocols, including Bluetooth, Bluetooth low energy (BLE), 802.11 compliant wireless local area network (WLAN), and/or any other wireless LAN protocol. Network 145 may use networking protocols, for example Transmission Control Protocol and Internet Protocol (TCP/IP), Asynchronous Transfer Mode (ATM), asymmetric digital subscriber line (ADSL), and/or any other networking protocol. Network 145 may comprise one or more routers, wireless routers, hubs, smart hubs, switches, smart switches, and/or any other type of networking equipment.

Apparatus 10 may comprise one or more input and/or output (I/O) devices such as 106 for receiving input from and/or providing output to a user. Exemplary I/O device(s) 106 of apparatus 10 may comprise one or more of: a touchscreen, a display, a keyboard, a mouse, voice activated software using speakers and microphone, a printer, a touchpad, game controllers, haptic devices, and/or the like. Additionally or alternatively, one or more standalone devices communicating with processor(s) 102, e.g., via the network 145, may serve as I/O device(s) 106, for example, a mobile and/or stationary computing device such as a smart phone, a tablet computer, a laptop computer, a desktop computer, a wearable computer, and/or the like, running a suitable application program, may establish communication (e.g., cellular, network, short range wireless) with the processor(s) 102 using a communication interface (e.g., network interface, cellular interface, short range wireless network interface). The user may input data and/or receive data outputted by the respective device, e.g., by entering and/or viewing data on a display of the computing device (e.g., a smart phone), optionally via a graphical user interface (GUI) application and/or the like.

Apparatus 10 may comprise a memory and/or data storage device such as 108, which may be configured to store code instructions executable by processor(s) 102, for example, a random access memory (RAM), a read-only memory (ROM), and/or a storage device, for example, a non-volatile memory, magnetic media, semiconductor memory devices, a hard drive, a removable storage, optical media (e.g., DVD, CD-ROM), and/or the like. Memory 108 may store code instructions that implement one or more acts of the method described with reference to FIG. 3 herein. Alternatively or additionally, one or more acts of the method described with reference to FIG. 3 herein may be implemented in hardware.

Memory 108 may comprise a pre-join and aggregation engine 110 configured to receive as input a dataset having values divided into dimensions and measurements, and to calculate and store, for different combinations of values of dimensions, one or more aggregates of respective values of one or more measurements. In some embodiments, the pre-join and aggregation engine 110 may use the one or more aggregated measurements to calculate and store, for at least one aggregate measurement of interest, a respective pre-calculated value for a respective combination of values of dimensions of the dataset. For example, in the exemplary illustrative scenario described herein, the aggregates "total sends" and "total clicks", denoting counts of the measurements of sent emails and links clicked by recipients thereof respectively, may be used in calculation of the aggregate measurement of "click rate" obtained as a ratio therebetween, with respect to a same combination of dimensions' values. In some embodiments, the pre-join and aggregation engine 110 may group and subsume respective values of one or more dimensions by a plurality of bins prior to calculation and storage of pre-calculated values. For example, as described herein with regard to the exemplary illustrative scenario, values of the dimensions "send_date_time" and "click_date_time" respectively, may be grouped into bins of "date" and "day_part", where a time of day within a date of a respective aggregate measurement being calculated may be mapped into one of several representative values, for example, 1, 2, and 3, denoting morning (e.g., 8 AM to 13

PM), noon (e.g., 13 PM to 16 PM) and afternoon (e.g., 16 PM and later) respectively. The pre-join and aggregation engine 110 may store as pre-calculated values any one of and/or all aggregates and/or functions thereof thus calculated, in a storage such as 120, for example. In some embodiments, the pre-join and aggregation engine 110 may store the pre-calculated values in a database schema such as, for example, a table, a relational database, and/or any likewise model and/or system of structured data storage and/or retrieval.

Memory 108 may comprise a query builder 180 configured to receive as input a selection of one or more dimensions and one or more aggregate measurements of interest and generate accordingly a query for calculating from the pre-calculated values the aggregate measurements of interest with respect to the dimensions as specified in the selection. Optionally the query builder 180 may further receive as input a selection of one or more filters on values of one or more dimensions. In some embodiments, the query builder 180 may generate the query in accordance with a same database schema as used for storing of the pre-calculated values, for example, the pre-calculated values may be stored in a relational database such as a table, and the query builder 180 may generate a Structured Query Language (SQL) query to be executed on the table storing the pre-calculated values. The query builder 180 may be configured to operate automatically without requiring any additional input from a user other than a selection of dimensions, measurements, and optionally filters, and with no coding being required by the user and/or other operator(s) of the system 100.

Apparatus 10 may comprise and/or be in communication with a data storage device such as 120 for storing data, for example, one or more tables of a dataset and/or relationships between table columns, a table of pre-calculated aggregates of measurements for combinations of values of dimensions of a dataset, data updates to a dataset having pre-stored historic data, and/or the like. Storage 120 may be implemented as, for example, a memory, a local hard-drive, a removable storage unit, an optical disk, a storage device, and/or as a remote server and/or computing cloud (e.g., accessed via a network connection).

System 100 may comprise another apparatus such as 15, which may be implemented similarly as the apparatus 10. Alternatively or additionally, apparatus 15 may be implemented as, for example, a client terminal, a thin client, and/or the like. Apparatus 15 may comprise one or more processors such as 152, a network interface such as 154, one or more I/O devices such as 156, and/or a memory such as 158, which may be implemented similarly as processor(s) 102, network interface 104, I/O device(s) 106, and/or memory 108 of apparatus 10, respectively.

Memory 158 may comprise a user interface (UI) such as 160 via which a user may insert data for, and/or be presented with data provided by the pre-join and aggregation engine 110, the query builder 180, and/or any likewise component of system 100, for example, the user may use the UI 160 to select a set of one or more dimensions and a set of one more aggregate measurements of interest, and optionally to select a set of one or more filters. The user selection of dimensions, measurements, and/or filters may be facilitated through the UI 160 by using, for example, dragging and dropping, box checking, menu scrolling, hovering and/or clicking over, fields for typing in and/or entering text, and/or the like. The user selection inserted via the UI 160 may be provided to the query builder 180 for generating a query based thereon for querying a data store (e.g., a database table) retaining the pre-calculated values, as calculated and stored by the pre-join and aggregation engine 110, and results returned from execution of the query on the data may be provided as output and presented to the user on UI 160.

Additionally or alternatively, results returned for the query may be further processed, recorded, visualized, and/or the like, such as for example, in generation of reports, graphs, charts, and/or the like which may be rendered for presentation on the UI 160 and/or one or more of the I/O device(s) 156.

It will be appreciated that while the apparatus 10 and apparatus 15 are illustrated in FIG. 1 as respective separate units in an exemplary architecture of a server and a client, the disclosed subject matter is not meant to be limited in such manner and other architectures such as wherein the apparatus 10 and apparatus 15 are a same and/or integrated single unit may be employed as well, as a skilled artisan would readily recognize.

Figure 2:
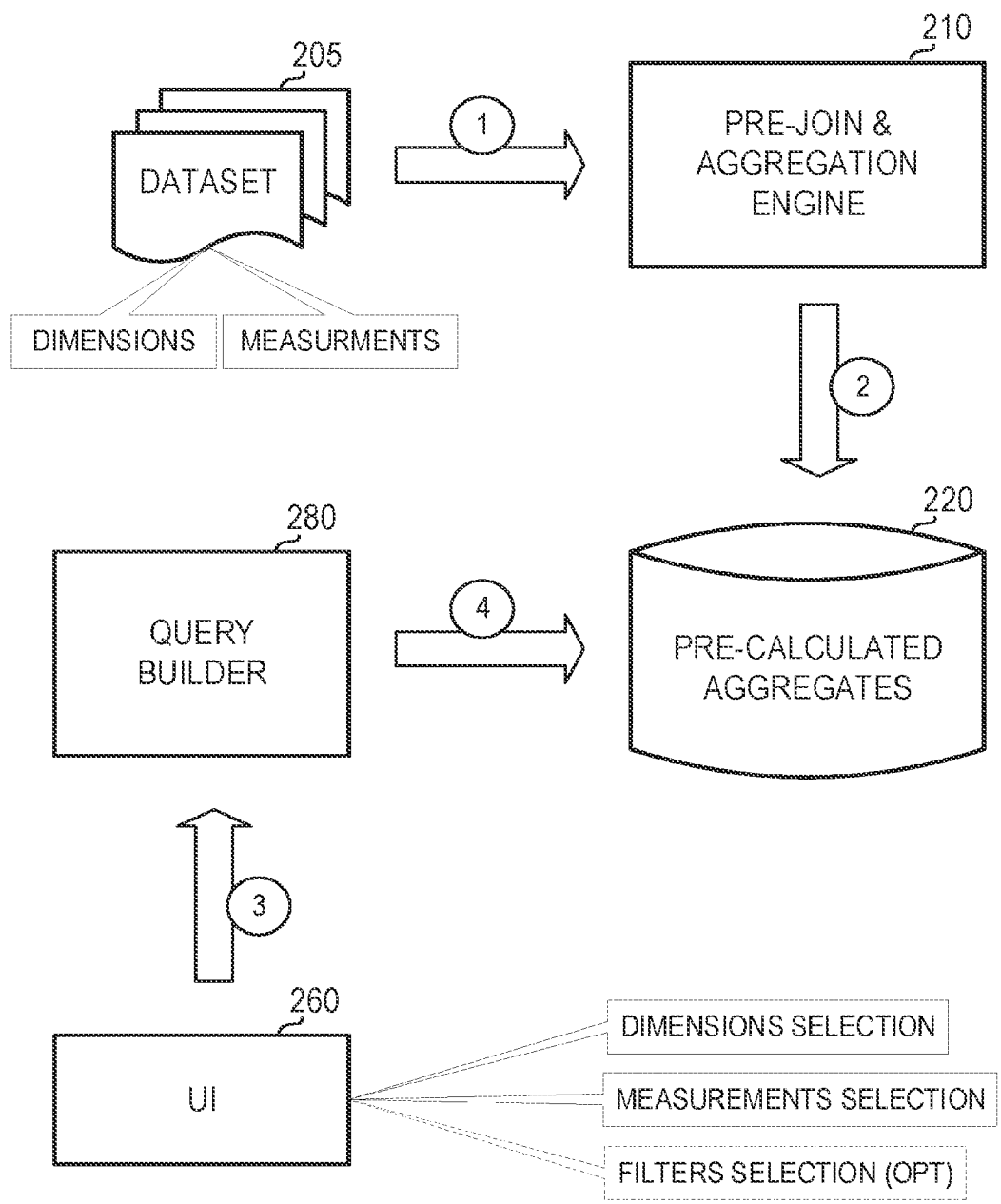
FIG. 2 is a schematic block diagram of an exemplary data flow of aggregate query optimization, according to some embodiments.

Reference is now made to FIG. 2 which is a schematic block diagram of an exemplary data flow of aggregate query optimization, according to some embodiments.

A dataset such as 205 having a plurality of values divided into a plurality of dimensions and a plurality of measurements may be received as input. The dataset 205 may be processed by a pre-join and aggregation engine 210, which may be configured and operative similarly as 110 of FIG. 1. The pre-join and aggregation engine 210 may calculate and store as pre-calculated aggregates 220 one or more aggregates of respective values of one or more measurements for a plurality of combinations of values of dimensions of the dataset 205. In some embodiments, respective values of dimensions in a combination for which an aggregate of respective values of a measurement calculated and stored by the pre-join and aggregation engine 210 may be at a finest granularity level. A user interface (UI) such as 260 may be provided and utilized for supporting user interaction and/or enhancing user experience. The UI 260 may be configured and operative similarly as 160 of FIG. 1. The UI 260 may be used to receive from a user as input a selection of dimensions, a selection of aggregate measurements, and optionally a selection of filters. The user selection received via the UI 260 may be provided to a query builder 280 for generating a query based thereon for querying the data store of pre-calculated aggregates 220. The query builder 280 may be configured and operative similarly as 180 of FIG. 1. The query generated by query builder 280 according to the user selection of dimensions and measurements obtained from UI 260 may be executed on the data store of pre-calculated aggregates 220 and results returned for the query may be provided as output. Additionally or alternatively, the results may be further processed and/or recorded for future reference and/or usage, for example.

Figure 3:
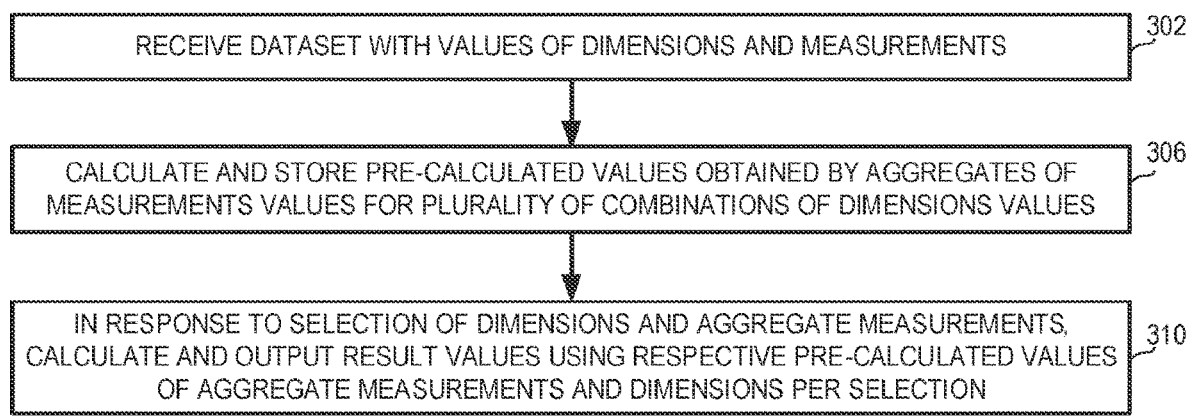
FIG. 3 is a flowchart of an exemplary method for aggregate query optimization, according to some embodiments.

Reference is now made to FIG. 3 which is a flowchart of an exemplary method for aggregate query optimization, according to some embodiments.

At 302 a dataset having a plurality of values divided into a plurality of dimensions and a plurality of measurements may be received.

At 306 pre-calculated values for a plurality of aggregate measurements of interest respective of a plurality of combinations of values of the plurality of dimensions of the dataset received at 302 may be calculated and stored, which pre-calculated values being obtained by calculating a plurality of aggregates of respective values of the plurality of measurements of the dataset received at 302 for the plurality of combinations.

At 310 in response to a selection of one or more dimensions and one or more aggregate measurements of interest, aggregate result values may be calculated and output, using respective pre-calculated values as calculated and stored at 306 of the aggregate measurements of interest and the dimensions per the selection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant aggregate query optimization tools and/or techniques will be developed and the scope of the term aggregate query optimization is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for aggregate query optimization, comprising:
    receiving a dataset comprising a plurality of values divided into a plurality of dimensions and a plurality of measurements;
    receiving an input comprising a first set of one or more of a plurality of dimensions and a second set of one or more of the at least one aggregate measurement of interest; and
    calculating and outputting for a respective member of a second set a respective aggregate result value by retrieving for the respective member of the second set the pre-calculated value respective of members of the first set that is obtained by calculating at least one aggregate of respective values of a measurement of the plurality of measurements.

2. The method of claim 1, wherein one or more of the at least one aggregate measurement of interest is calculated as a function of a plurality of aggregates respective of at least a subset of the plurality of measurements.

3. The method of claim 1, wherein in response to the input further comprising a third set of one or more filters defining a selection of values of one or more of the plurality of dimensions, performing the retrieving selectively whereby using a member of the third set for filtering a respective member of the first set.

4. The method of claim 1, further comprising, prior to the calculating and storing, for at least one of the plurality of dimensions, grouping and subsuming respective values thereof by a plurality of bins.

5. The method of claim 1, wherein the input is received via a user interface whereby selection of the first set and the second set by a user is provided.

6. The method of claim 5, wherein selection of a third set of one or more filters defining selection of values of one or more of the plurality of dimensions by a user is further provided by the user interface.

7. The method of claim 1, wherein the pre-calculated value is stored in a data store structured in accordance with a database schema, wherein the retrieving of the pre-calculated value and the calculating of the respective aggregate result value are performed using a query automatically constructed based on the database schema and executed on the data store.

8. The method of claim 1, further comprising incrementally updating the pre-calculated value in response to receiving additional data of the dataset.

9. The method of claim 1, wherein the dataset comprising a plurality of tables, wherein columns of different tables having defined connections between one another.

10. The method of claim 1, wherein the at least one aggregate is calculated using an aggregate function selected from the group consisting of: a summation, a count, an average, a minimum, and a maximum.

11. A computer program product comprising:
a non-transitory computer readable storage medium;
program instructions that are for executing, by a processor, a method for aggregate query optimization, the method comprising:
receiving a dataset comprising a plurality of values divided into a plurality of dimensions and a plurality of measurements;
receiving an input comprising a first set of one or more of a plurality of dimensions and a second set of one or more of the at least one aggregate measurement of interest; and
calculating and outputting for a respective member of a second set a respective aggregate result value by retrieving for the respective member of the second set a pre-calculated value respective of members of the first set that is obtained by calculating at least one aggregate of respective values of a measurement of the plurality of measurements.

12. The computer program product of claim 11, wherein one or more of the at least one aggregate measurement of interest is calculated as a function of a plurality of aggregates respective of at least a subset of the plurality of measurements.

13. The computer program product of claim 11, wherein in response to the input further comprising a third set of one or more filters defining a selection of values of one or more of the plurality of dimensions, performing the retrieving selectively whereby using a member of the third set for filtering a respective member of the first set.

14. The computer program product of claim 11, wherein the program instructions further comprising instructions for performing, by the processor: prior to the calculating and storing, for at least one of the plurality of dimensions, grouping and subsuming respective values thereof by a plurality of bins.

15. The computer program product of claim 11, wherein the input is received via a user interface whereby selection of the first set and the second set by a user is provided.

16. The computer program product of claim 15, wherein selection of a third set of one or more filters defining selection of values of one or more of the plurality of dimensions by a user is further provided by the user interface.

17. The computer program product of claim 11, wherein the pre-calculated value is stored in a data store structured in accordance with a database schema, wherein the retrieving of the pre-calculated value and the calculating of the respective aggregate result value are performed using a query automatically constructed based on the database schema and executed on the data store.

18. The computer program product of claim 11, wherein the program instructions further comprising instructions for performing, by the processor: incrementally updating the pre-calculated value in response to receiving additional data of the dataset.

19. The computer program product of claim 11, wherein the dataset comprising a plurality of tables, wherein columns of different tables having defined connections between one another.

20. A system comprising:
a processing circuitry configured to:
receive a dataset comprising a plurality of values divided into a plurality of dimensions and a plurality of measurements;
receive an input comprising a first set of one or more of the plurality of dimensions and a second set of one or more of the at least one aggregate measurement of interest; and
calculate and output for a respective member of a second set a respective aggregate result value by retrieving for the respective member of the second set a pre-calculated value respective of members of the first set that is obtained by calculating at least one aggregate of respective values of a measurement of the plurality of measurements.

* * * * *